June 29, 1937.

J. F. KOCA

Re. 20,429

TYPESETTING MECHANISM FOR TYPEWRITERS

Original Filed July 18, 1930 3 Sheets-Sheet 1

Inventor:
By James F. Koca,
Chas. M. Nissen,
Atty.

June 29, 1937. J. F. KOCA Re. 20,429

TYPESETTING MECHANISM FOR TYPEWRITERS

Original Filed July 18, 1930 3 Sheets-Sheet 2

Inventor
James F. Koca,
By Chas. M. Nissen,
Atty.

June 29, 1937. J. F. KOCA Re. 20,429

TYPESETTING MECHANISM FOR TYPEWRITERS

Original Filed July 18, 1930 3 Sheets-Sheet 3

Inventor:
James F. Koca,
By Chas. M. Nissen,
Atty.

Reissued June 29, 1937 Re. 20,429

UNITED STATES PATENT OFFICE 20,429

TYPESETTING MECHANISM FOR TYPEWRITERS

James F. Koca, Woodstock, Ill., assignor to Woodstock Typewriter Company, Woodstock, Ill., a corporation of Illinois Original No. 1,897,983, dated February 14, 1933, Serial No. 468,885, July 18, 1930. Application for reissue October 25, 1934, Serial No. 750,022

38 Claims. (Cl. 113—59)

My invention relates to the connecting of type elements to type-bars of typewriting machines, to an improved manner of effecting this operation and to improved and efficient apparatus for effecting the operation.

It is an object of the invention to provide a new and improved method for positioning type elements and type bars of a typewriter in juxtaposition and for securing them together.

Another object of the invention is the provision of improved and efficient mechanism for positioning type-elements and type-bars of a typewriter to facilitate the soldering of the type-element to the type-bar accurately in adjusted position.

Another object of the invention is the provision of a matrix for definitely locating or positioning the type-elements for connection to type-bars mounted on the type-bar segment.

Another object of the invention is the provision of electromagnetic mechanism to facilitate the holding of a type-element connected to a matrix while such type-element is being soldered to a type-bar of a typewriter.

Other objects of the invention will appear hereinafter, the novel features and combinations being set forth in the appended claims.

In the accompanying drawings

Figure 1:
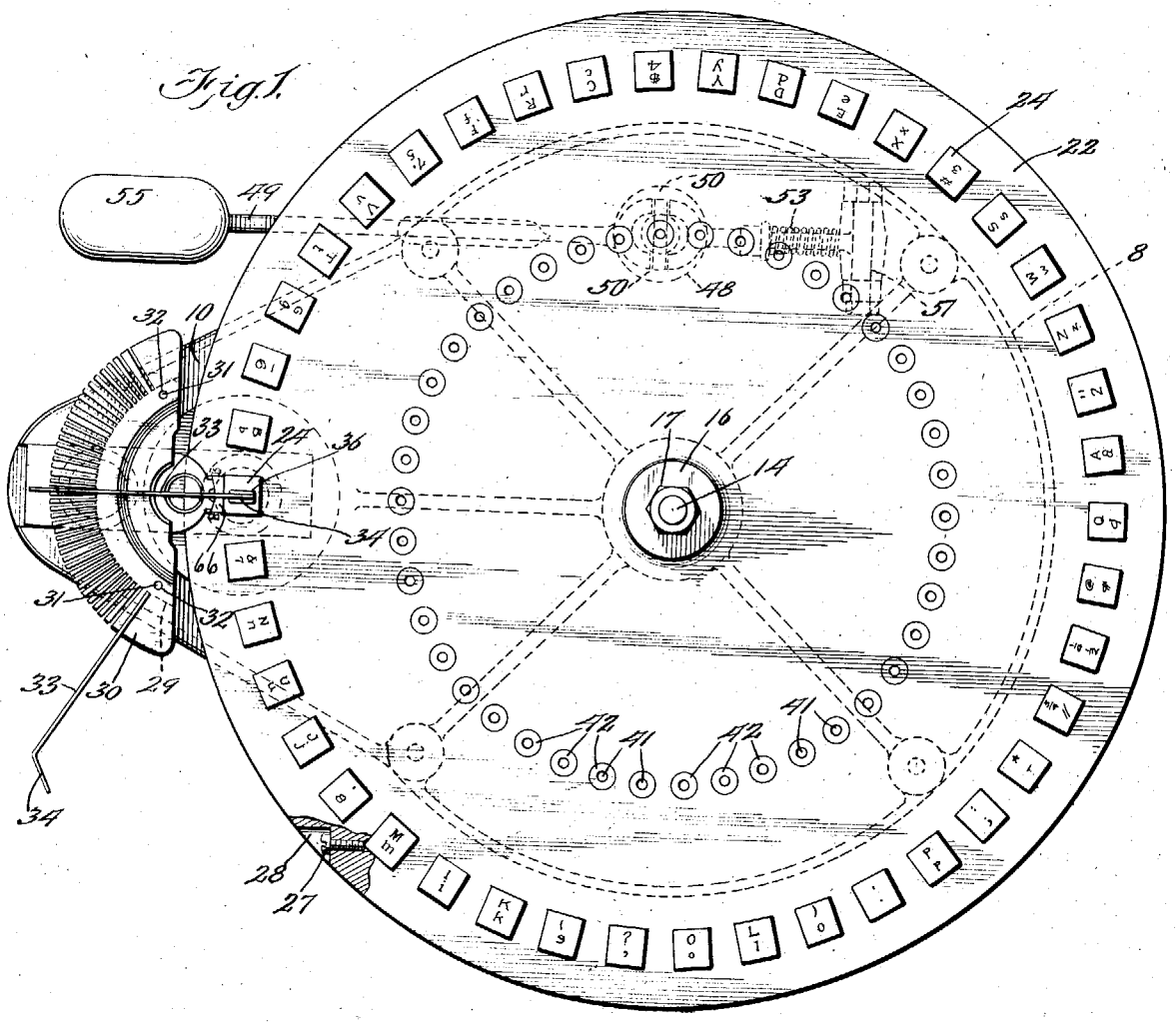
Figure 1 is a plan view of type-setting apparatus embodying my improvements by which my improved method of connecting type elements to type bars is effected.
Figures 2, 3:
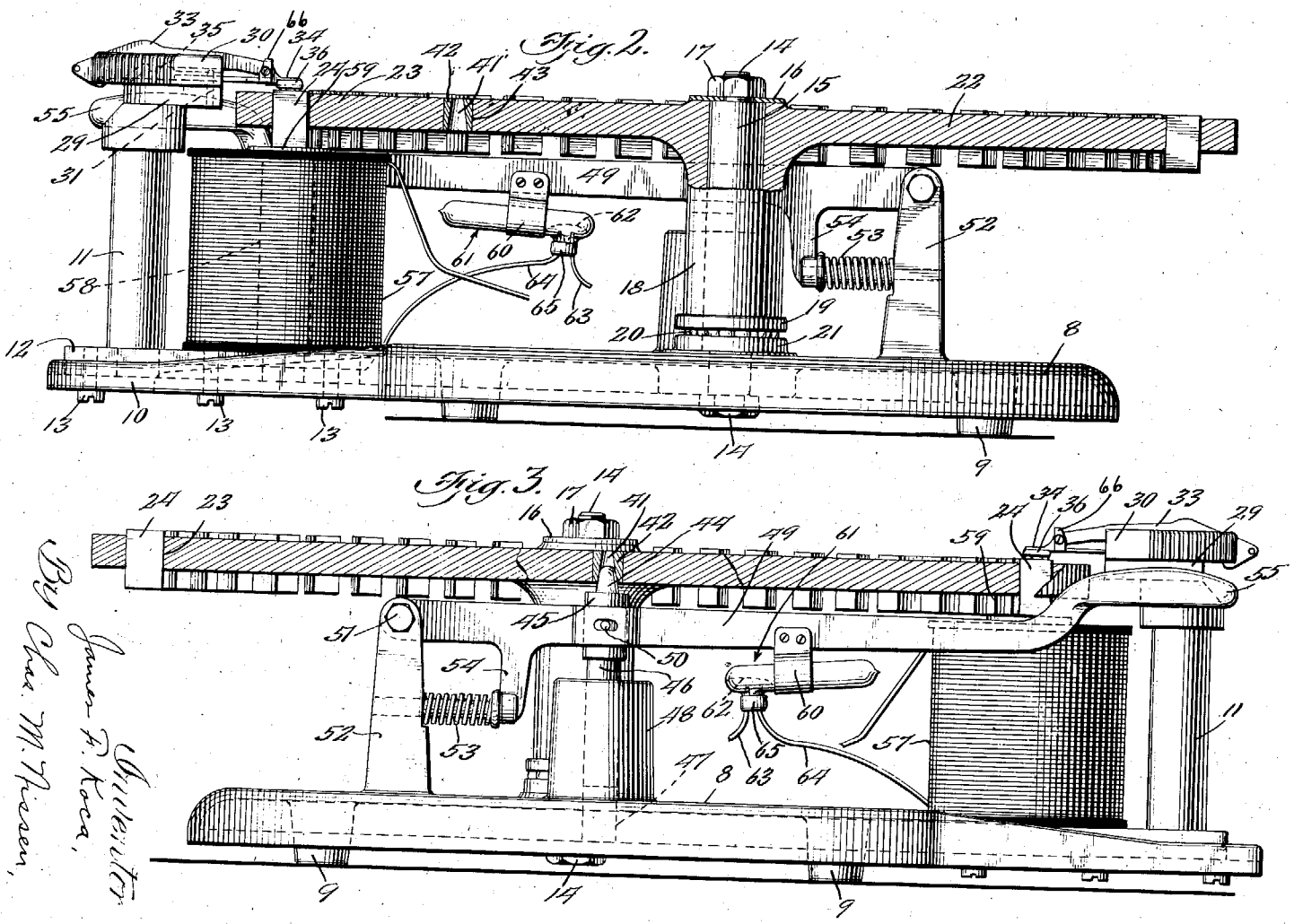
Figure 2 is an elevational view, partly in section, of the construction shown in Fig. 1.
Figure 3 is an elevational view similar to Fig. 2 but taken from the opposite side of the structure shown in Fig. 1.

In Figs. 2 and 3, 8 designates the base plate of the supporting frame. This base plate may be provided with foot rests 9, 9 for engagement with the surface on which the machine is supported. As shown in Fig. 1 in dotted lines, the base plate 8 is circular over approximately three-quarters of the circumference, but at the left as viewed in Fig. 1, is provided with a tapering extension 10 for supporting the upright pedestal 11. The pedestal 11 may be secured at its lower end to the auxiliary plate 12 and the latter secured to the extension 10 by means of the cap screws 13, 13.

At the center of the circular portion of the base plate 8, is an opening for receiving the bolt 14. Surrounding the shank of the bolt 14 above the upper surface of the base plate 8 is a sleeve bearing 15, the lower end of which may engage the top of the base plate 8 and the upper end of which is engaged by the washer 16. By means of a nut 17 the washer 16 and sleeve bearing 15 may be rigidly connected to the base plate 8 in stationary position.

Journaled on the sleeve bearing 15 is a vertical cylindrical hub 18, the lower end of which at 19 is adapted to rest on balls 20 of a ball-bearing 21 on top of the base plate 8.

Connected to the hub 18 and preferably integral therewith, is a circular matrix plate 22. Since the sleeve bearing 15 is clamped by means of the bolt 14 and nut 17 in fixed, stationary position relative to the plate 8, the circular plate 22 is mounted for rotation on the ball-bearing 19, 20, 21 and the under side of the washer 16 may serve as a bearing for the upper side of the hub 18. It will thus be seen that while the circular plate 22 is mounted for rotation on a vertical axis concentric with the hub 18 and bearing 15, the plate 22 is confined by the washer 16 and the ball-bearing 19, 20, 21 against vertical movements relatively to the base plate 8.

Figure 4:
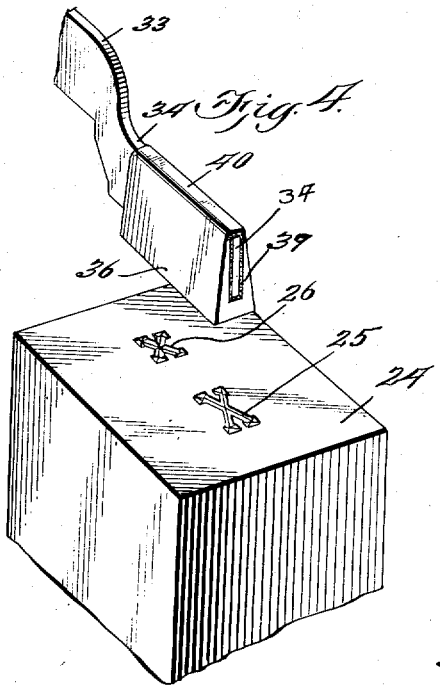
Figure 4 is an enlarged view of the matrix block and also of a type-element soldered to a type-bar.

In square or rectangular openings 23 in the peripheral portion of the circular plate 22 are matrix blocks 24. The openings 23 are spaced apart circumferentially and each is of the same horizontal cross-sectional area as the horizontal cross-sectional area of the matrix block which fits into the same. The matrix blocks have depressed in the upper surfaces thereof the various characters of the typewriter, to form the matrices. For instance, in Fig. 4 the matrix block 24 has depressed in its upper surface the capital letter X, as shown at 25 and at 26 the small letter x is shown.

The matrix blocks are all of the same length measured vertically and their lower surfaces are all in the same horizontal plane. Likewise the upper surfaces of the matrix blocks 24 are in the same horizontal plane and the inner circumferentially spaced characters as shown in Fig. 1, are each equi-distant from the center of rotation of the matrix plate 22; likewise the matrix characters in the outer circular row are equi-distant from the center of rotation of the plate 22. After each matrix block 24 is accurately positioned in its opening 23 it may be securely held in its adjusted position by means of a set screw 27 with its head in a recess 28 in the periphery of the circular plate 22 as shown in Fig. 1.

Mounted on top of the pedestal 11 is a fixed and stationary arcuate support or table 29 corresponding in contour with the rear face of a type-bar segment 30. Secured to the arcuate support 29 and projecting upwardly therefrom are two spaced-apart vertical pins 31 adapted to project into openings 32, 32 in the type-bar segment 30. The arrangement is such that any one of the plurality of type-bars 33 may be moved to its platen striking position with the assurance that the outer end portion 34 will occupy its proper position for having the type-element soldered thereto. Although in Fig. 1 I have shown only two type-bars 33, it should be understood that the type-bar segment has a type-bar pivoted in each of the slots shown.

When a type-bar 33 is moved to the position shown in Fig. 2 its underside abuts against the stop 35 which is mounted on the front face of the type-bar segment 30 in position to limit the downward movement of the type-bar 33 and hold its outer end portion 34 at the proper elevation for soldering of the type-element thereto.

On the type-bar segment 30 is mounted a type-bar guide 66 relatively to which the type-bars have been adjusted prior to mounting of the segment 30 on the pedestal 11, so as to hold the type-bars against sidewise movement when in platen striking positions.

The type-element 36 has on its underside the type corresponding to the matrix depressions 25 and 26. That is to say, the type-element corresponding to the matrix block 24 of Fig. 4 has the capital letter X as shown at 37 in Fig. 6 and also a small letter x and these letters are adapted to fit into the matrix depressions 25 and 26 in the top of the block 24.

Figure 5:
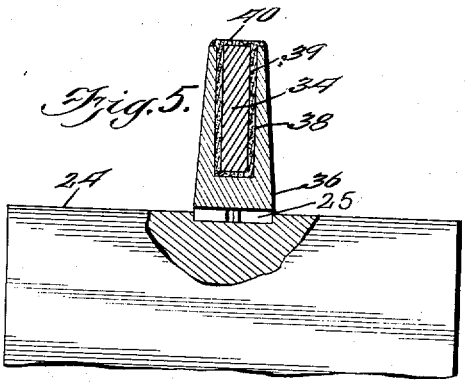
Figure 5 is an elevational view, partly in section, of the matrix block with the type-element associated therewith showing the type-bar soldered to the type-element.
Figure 7:
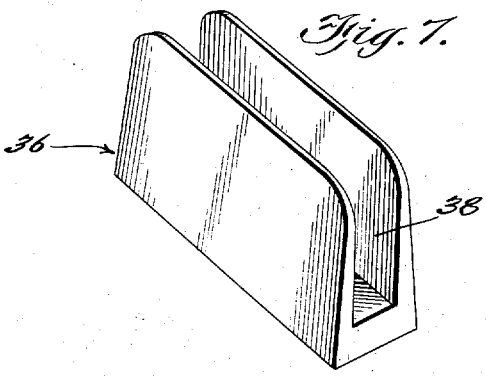
Figure 7 is an enlarged perspective view of the upper portion of the type-element adapted to receive the type-bar.
Figure 6:
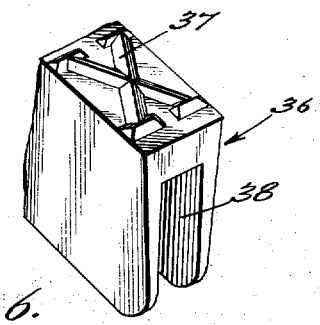
Figure 6 is an enlarged perspective view of a part of a type-element.

The type-element is U-shaped in cross-section as illustrated at 38 in Figs. 5, 6 and 7. When the extension 34 of the type-bar 33 is in proper position as determined by the abutment 35 and the type-element is held in proper position in the matrix depressions in the top of the matrix block, the extension 34 will be spaced a short distance at its sides and at its bottom from the bottom and inner walls of the U-shaped portion of the type-element. When the extension 34 and type-element are thus held, solder may be melted and permitted to run into the space between the extension 34 and the inner bottom and side walls of the U-shaped type-element, and such soldering is illustrated at 39 in Fig. 5. When the soldered connection is completed the solder may be extended as indicated at 40 so as to co-act with the solder 39 and entirely surround the extension 34 and thus very securely connect the type-element to the type-bar very accurately in adjusted position.

In order to hold the rotatable matrix plate 22 accurately in adjusted position for each of the matrix blocks, I have provided a series of spaced-apart circumferentially arranged tapered recesses 41 as shown in Figs. 1, 2 and 3. These tapered recesses 41 may be formed in cylindrical blocks 42 placed in openings 43 in radial alinement with the character depressions in the upper surfaces of the matrix blocks 24.

Adapted to project upwardly into the tapered recesses 41 is a corresponding tapered detent 44 as shown in Fig. 3. The detent 44 is mounted on a cylindrical block 45 to the lower end of which is secured a vertical cylindrical rod 46 which is adapted to slide in a cylindrical opening 47 in the pedestal 48 mounted on top of the base plate 8. The cylindrical block 45 is adapted to extend through an opening in the operating lever 49 and by means of pin and slot connections such as that illustrated at 50 in Fig. 3, upward and downward movements of the lever 49 are imparted to the detent 44 while the depending rod 46 is guided vertically in the opening 47 in the pedestal 48.

The lever 49 is pivoted at 51 to the top of the pedestal 52 which is mounted on the base plate 8. A spring 53 is connected between the standard 52 and the arm 54 which depends from the lever 49 between the pivot 51 and the block 45. By means of a handle 55 the detent 44 may be depressed against the action of the spring 53 to release the detent from one of the recesses 41. While the handle 55 is being held down, the matrix plate 22 may be freely turned on its vertical axis for selection of the matrix block with matrix characters thereon corresponding to the type-bar to which a certain type-element is to be connected.

When the selected matrix block is located in position for the selected type-bar to be associated therewith, the handle 55 may be released, whereupon the spring 53 will move the detent 44 upwardly into the recess 41 which corresponds to the selected matrix block. Therefore while the type-element is being soldered to the extension 34 of the type-bar, the matrix plate or turntable will be automatically held in adjusted position.

In order to hold the type-element accurately and automatically in its seats or matrices afforded by the character depressions in the selected matrix block, I have provided electromagnetic mechanism for magnetizing the matrix block and the type-element. For this purpose each of the matrix blocks 24 is composed of magnetic material such as iron or steel, while the circular matrix plate or turntable 22 is composed of non-magnetic material such as brass.

The electromagnetic mechanism preferably comprises a single electromagnetic winding 57 on a core 58 of soft iron, the lower end of which is connected to the iron plate 12. The pedestal 11 and the support 29 thereon are also of soft iron. Therefore when the iron or steel type-bar segment 30 is mounted on the pins 31 and support 29 and the type-bar 33 is swung to the position shown in Fig. 2 with the extension 34 in the U-shaped recess 38 of the type-element 36, a magnetic circuit will be completed with only a small air gap therein. The lower surfaces of the matrix blocks may be in the plane coinciding with the upper surface of the upper pole 59 of the core 58 of the electromagnet. It should be understood, however, that while an accurate sliding fit is desirable between the lower surfaces of the matrix blocks 24 and the upper surface of the pole 59, there should be freedom of rotation of the turntable 22 when the latter is released by depression of the handle 55 and the withdrawal of the detent 44 from the recess 41. However, even though there should be a slight air gap between the lower surfaces of the matrix blocks 24 and the upper surface of the pole 59 while rotating the turntable 22, when the electromagnet is energized the block 24 adjacent the pole 59 will be drawn by the latter into contact therewith and therefore such pole will act to accurately locate the upper surface of the block 24 at a predetermined elevation, all of the blocks being of exactly the same length.

In order to facilitate turning of the plate 22, I have provided means for de-energizing the electromagnet 57 when the handle 55 is depressed to release the detent 44 from the recess 41. Suspended from the lever 49 by means of the support 60 is a mercury vacuum switch 61 comprising a hermetically sealed glass tube with a globule of mercury 62 therein. Terminals of the supply leads 63, 64 are connected at 65 so as to project into the glass tube while being insulated from each other. The mercury switch is mounted in a tilted position as shown in Fig. 3 so that when the lever 49 is in its upper position the mercury 62 will connect the terminals and complete the circuit of the solenoid 57 so as to energize the same. When the handle 55 is pressed down to release the detent 44 the mercury switch will be opened to effect deenergization of the electromagnet and consequently the matrix blocks 24 may be moved along the top of the pole 59 without being attracted or held thereby. When, however, the selected matrix block is brought over the top of the pole 59 and the lever 49 is released to cause the detent 44 to enter the recess 41 corresponding to the selected matrix block, the mercury switch will be reclosed by movement to the position shown in Fig. 3.

After a matrix block 24 has been selected and the electromagnet has been energized the selected matrix block will become magnetized. Therefore when the type-element corresponding to the character depressions in the matrix block is placed in position on the latter it will also become magnetized and the magnetic attraction between the matrix block 24 and the type-element will effect holding of the latter very accurately in the desired position. This is illustrated in Fig. 5 as well as in Fig. 2. Now, when the type-bar 33 is swung over to its position shown in Fig. 2 it will rest on the abutment 35. The magnetic circuit for the lines of force of the electromagnet then extends through the pedestal 11, the support 29, the type-bar segment 30 and type-bar 33 to the extension 34. Such completion of the magnetic circuit will increase the attraction between the matrix 24 and the type-element 36 to hold the latter still more firmly in adjusted position. The magnetic circuit will also hold the type-bar 33 in position. The only air gap in the whole magnetic circuit is the space between the extension 34 and the bottom and inner walls of the type-element 36. The parts are held accurately in adjusted positions for soldering of the type-element to the extension 34 without the necessity of holding any part whatever manually. The soldering may be effected by melting solder with a soldering iron and permitting it to run into and fill up the air gap, and while this takes place and the solder is still in molten condition the magnetic circuit remains so that the magnetic attraction between the matrix block 24 and the type-element will firmly hold the type-element accurately in adjusted position and the type-bar will also be held in position while the solder is becoming set.

The lever 55 may then be depressed to deenergize the electromagnet, whereupon the type-bar 33 may be moved back with the type-element soldered thereto. The turntable may then be shifted to another position and the type-bars swung one after another against the abutment 35 for repetition of the operation of soldering of the type-element thereto. It should be noted that the matrix plate or turntable 22 has mounted thereon matrix blocks with matrix depressions thereon for all of the characters of a typewriter and therefore all of the type-elements for the type-segment 30 may be soldered to the type-bars before the type-segment is removed and another placed on the support 29.

It should also be noted that the electromagnet comprising the plate 12, the core 58, the pedestal 11 and the support 29 is detachable by means of the cap screws 13. This arrangement is preferred so that the electromagnet may have its magnetic flux increased by the use of soft iron especially adapted to an electromagnet. The base plate 8 may be of any desired material suitable for casting, but it is desirable to construct the plate 22 of non-magnetic material such as brass so as to concentrate the magnetic lines of force through the selected matrix block 24 to the type-element 36 mounted thereon.

Obviously those skilled in the art may make various changes in the details and arrangement of parts and operation steps without departing from the spirit and scope of the invention as defined by the claims hereto appended and I wish therefore not to be restricted to the precise construction and operation steps herein disclosed.

I claim:

1. In a machine for setting type on typewriter type-bars, the combination with a type-bar support, of a shiftable matrix capable of alignment with respect to the support, means to secure the matrix in aligned position and magnetic means for holding a type-bar and a type-slug in a predetermined position relative to the aligned matrix and type-bar support.

2. In a type-setting machine, the combination with a type-bar support, of a shiftable matrix formed of magnetic material, means to align the matrix with the type-bar support, a magnet associated with said matrix, said support means being in the magnetic circuit of said magnet for supporting the type-bar in a predetermined position relative to said matrix.

3. In a type-setting machine, the combination with a support for a type-bar segment, to which a type-slug is to be attached, of a shiftable matrix for the type slug, means to align the matrix with respect to the support, and means for magnetizing said matrix to hold the parts precisely in aligned position while the slug is attached to the bar.

4. In a type-setting machine, the combination with a type-matrix for snugly receiving a type element, of a support for a type-bar and means for establishing magnetic lines of force through the type-bar, the matrix and said type-element received therein to hold the latter in close fit with said matrix while said type-element is being secured to the type-bar.

5. In a type-setting machine, the combination with a matrix, for snugly receiving a type-element adapted to fit the same, of means for supporting a type-bar in position for soldering the type-element thereto, said matrix, and supporting means being of magnetic material, and an electromagnet having its poles connected in circuit with said parts of magnetic material to effect magnetic holding of the type-element to the matrix while such soldering is effected.

6. In a type-setting machine, the combination with a matrix of magnetic material, of a type-bar support of magnetic material, and an electromagnet comprising a single solenoid, one of the poles of said electromagnet being connected to said support and its other pole being associated with said matrix.

7. In a type-setting machine, the combination with a type-bar support of magnetic material, of a single solenoid electromagnet having a core of magnetic material connected at one end to said support, and a matrix of magnetic material associated with the other end of said core.

8. In a type-setting machine, the combination with a pedestal of magnetic material, of means on top of the same for supporting a type-bar segment, a matrix of magnetic material, and an electromagnet having an upright core of magnetic material with its lower end connected to said pedestal and its upper end associated with the lower side of said matrix.

9. In a type-setting machine, the combination with a shiftable matrix, of releasable means for holding said matrix in adjusted position, electromagnetic means for magnetizing said matrix, and means for controlling the releasable matrix holding means and said electromagnetic means.

10. In a type-setting machine, the combination with an adjustable matrix, of an electromagnet associated therewith, a switch for controlling the energization of said electromagnet, means for holding said matrix in adjusted position, and connections between said holding means and said switch to effect operation of the latter to de-energize said electromagnet when the holding means is moved to releasing position.

11. In a type-setting machine, the combination with an adjustable matrix, of means for magnetizing the same, a switch for controlling said magnetizing means, means for holding said matrix in adjusted position, and a releasing lever connected to said holding means and said switch.

12. In a type-setting machine, the combination with an adjustable matrix, of means for holding the same in adjusted position, an electromagnet associated with said matrix, a lever for releasing said holding means, and a mercury switch operable by said lever to open position when said holding means is released and to closed position when said lever is released.

13. In a type-setting machine, the combination with a matrix, of a turntable for adjustably supporting the same, means comprising a detent for holding said matrix in adjusted position, a lever for releasing said detent to free said turntable for adjustment, an electromagnet associated with the said matrix when in its adjusted position, and a switch operable by said lever to control the energization of said electromagnet.

14. In a type-setting machine, the combination with a turntable of non-magnetic material at its peripheral portion, of a plurality of matrices of magnetic material mounted in circumferential spaced-apart relation in such peripheral portion, an electromagnet, means for holding said turntable in adjusted position with any one of said matrices associated with said electromagnet in a predetermined position, and means for supporting a type-bar segment in predetermined relation to such predetermined position.

15. In a type-setting machine, the combination with a plurality of matrices, of means for supporting the same for adjustment of each to a predetermined position, an electromagnet associated with such position, a support for a type-bar segment, and means for controlling the energization of said electromagnet.

16. In a type-setting machine, the combination with a support for a type-bar segment having thereon the type-bars for all the characters of a typewriter, of a plurality of type-element receiving and supporting matrices corresponding to the type-elements comprising all of the type characters of the typewriter, means to support said matrices for sequential adjustment each into aligned position with respect to the said supported position of said type-bars to position each supported type-element in time for soldering to its corresponding type-bar, and electro-magnetic means for magnetizing the matrices to firmly hold the type-elements therein when in aligned position to hold the type elements and the outer ends of their respective type-bars in position for soldering.

17. In a type-setting machine, the combination with a matrix of a shiftable matrix support, a detent for latching the matrix in adjusted position, electromagnetic means over which the matrix may be shifted by the movement of the support, means including a switch for magnetizing said matrix and means simultaneously operative to withdraw the detent to unlatch the matrix supported for shifting movement and to operate the switch to render the magnetizing means inoperative.

18. In a type-setting machine, the combination with a magnet of a pivoted support having a matrix carrying portion adapted to swing above the magnet, a matrix carried in said portion in position to be aligned with respect to the magnet by the shifting movement of the support, latch means to hold the support in matrix aligning position and means to energize the magnet.

19. In a type-setting machine, the combination with a magnet of a pivoted support having a matrix carrying portion adapted to swing above the magnet, a matrix carried in said portion in position to be aligned with respect to the magnet by the shifting movement of the support, latch means to hold the support in matrix aligning position and means to energize the magnet and means to simultaneously unlatch the support latching mechanism and render the magnet energizing means inoperative.

20. In a type-setting machine, the combination with a magnet, of a rotatable turntable having a periphery adapted to move above the magnet, a spaced series of matrices of magnetic material carried in the periphery of the turntable in position to be sequentially aligned with the magnet by the turning movement of the turntable, means to latch the turntable against rotation when any of the matrices is so aligned and means to energize the magnet to firmly secure the aligned matrices in aligned position.

21. In a type-setting mechanism the combination, with a matrix for snugly receiving a type-slug, of a support for a type-bar, and means for creating lines of magnetic force through said matrix and said type-bar whereby to securely hold same together upon the type-slug, while the type-slug is being attached to the bar.

22. The method of fixing type-elements to type-bars which comprises locating a type-element matrix at a given position, placing a type-element in the matrix, bringing to said position the end of a type-bar to which the type-element is to be secured, passing a magnetic circuit through the matrix type-element and type-bar to hold them at said position and in predetermined relation to each other, and securing said type-element and type-bar end permanently together.

23. The method of securing type-elements to type-bars which comprises turning a rotatably mounted disc which is provided with a plurality of type matrices rigidly mounted thereon in spaced relation to the pivotal axis of said disc to place a predetermined matrix in a given position, placing a type-element corresponding to said matrix in the matrix, placing a type-plate provided with a plurality of type-bars pivotally mounted thereon upon a table located in spaced relation to said position, swinging a type-bar corresponding to said element upon its pivot to bring the type-bar end to said position, operating a control member to lock said disc in position and to simultaneously energize an electromagnet to hold said matrix type-element and type-bar end in predetermined relation, and soldering said type-element and type-bar end together.

24. The process of joining type bars and type characters which consists in turning a rotatably mounted disc which is provided with a plurality of type matrices rigidly mounted thereon in spaced relation to the pivotal axis of said disc, to place a determined one of said matrices in a determined position, in holding said disc with said matrix in said position, in placing a corresponding type character in said placed matrix, in placing a plate provided with a plurality of type bars pivotally mounted thereon in spaced relation to said disc, and in holding said plate in said spaced relation, in turning a corresponding type bar into determined relation with said type character in said placed matrix, in holding said type character in said matrix and holding said type bar in said relation to said type character, and in heating said character and the portion of said bar in said relation thereto to a temperature sufficiently high to join, and joining said character and bar; substantially as herein described.

25. The method of soldering type characters to type bars comprising forming a magnetic circuit through the type character and through substantially the entire length of said type bar in such manner that one end of the type bar is held by the magnetic flux in a position wherein the type character is in close proximity thereto, and then soldering said type character to said type bar.

26. The method of soldering a type character to type bar comprising placing said type character face downwards on a matrix adapted to prevent lateral displacement of the type character, bringing one end of said type bar into close proximity with said type character, forming a magnetic circuit through said matrix, said type character and substantially the entire length of said type bar, and then soldering said character to said type bar.

27. A process which consists of successively moving a plurality of matrices to a common point, in placing a corresponding type character in the matrix positioned at said common point, in selecting a pivotally mounted type bar and moving the free end thereof to said common point, in applying an electro-magnetic current through the length of said selected type bar and through said type character and the application of heat to permanently join said bar and character.

28. In a typesetting machine a base, a table rotatably mounted upon said base, said table having mounted therein circumferentially in spaced relation a plurality of type matrices, means to lock said table in a predetermined position, a second table rigidly mounted in determined spaced relation to said rotatable table, and means to hold a plate provided with type-bars pivotally mounted thereon in predetermined position upon said stationary table.

29. In a type bar soldering machine, in combination, a base, a disc rotatably mounted on said base, means to determine the angular position of said disc, matrices on said disc, a table in determined spaced relation to said disc, means to hold a plate provided with type bars mounted thereon in determined relation with type characters in said matrices and means to solder a determined type bar and a type character in a determined matrix together.

30. In a type bar soldering machine, in combination, a base, a disc rotatably mounted on said base, apertures in spaced relation around the axis of said disc and matrices in spaced relation around said axis, a table in determined spaced relation to said disc, a longitudinally movable pin adapted to successively engage with said spaced apertures, means to withdraw said pin from said apertures, means to hold a plate provided with type bars pivotally mounted thereon on said table, and means to solder a determined type bar and a determined type character together.

31. In a type bar soldering machine, a disc, a base, a ball bearing interposed between said disc and said base, means comprising apertures in spaced relation to adjacent ones and to the axis of said disc and a longitudinally movable pin successively engageable with said apertures, to determine the angular position of said disc, in combination with means to control the position of said pin relative to said apertures, matrices on said disc in spaced relation to said apertures, a table in spaced relation to said matrices, means to hold a plate provided with type bars pivotally mounted thereon in a determined relation to type characters in said matrices, and means to solder a type character in a determined matrix to a determined type bar.

32. In a type bar soldering machine, a base, a disc rotatably mounted on a ball bearing interposed between said disc and said base, means comprising apertures in spaced relation to adjacent ones and to the axis of said disc and a longitudinally movable pin successively engageable with said apertures, to determine the angular position of said disc, in combination with means to control the position of said pin relative to said apertures, said apertures extending inward from the under side of said disc, matrices of magnetizable material in spaced relation to said apertures mounted on said disc, a table in determined spaced relation to said matrices, means to hold a type plate provided with bars pivotally mounted thereon in determined relation to type characters in said matrices, and means to solder a type character in a determined matrix to a determined type bar.

33. In apparatus of the kind described, a rotatably mounted disc, means for holding said disc in a determined position, matrices on said disc equally spaced from each other and the axis of rotation of said disc, said matrices being provided with depressions adapted to hold type characters loosely on the upper face of said disc, means for bringing a determined type bar into determined relation to a character in a determined matrix, and means for soldering said character to said bar.

34. In apparatus of the kind described, means for supporting movably mounted type bars, means for supporting a type character, and electromagnetic means for creating a magnetic field passing through substantially the entire length of said type bar and through said character to hold them in positions wherein they may be soldered to each other.

35. In apparatus of the kind described a matrix for supporting a type character with its face downwards, said matrix being adapted to prevent lateral displacement of said type character, means for supporting a pivoted type bar, and electromagnetic means for forming a magnetic circuit through said type character and through the entire length of said type bar to retain one end of the type bar in a position wherein it may be soldered to said type character.

36. In apparatus of the kind described, a disc mounted for rotation around a vertical axis, a plurality of matrices of magnetic material adapted to hold type characters, said matrices being engageable with the faces of said type characters and being adapted to prevent lateral displacement of said type characters, means for supporting a bracket having a plurality of type bars pivoted thereto, the disc being adapted to bring said matrices into registry with the means for supporting said type bars whereby a type bar may be swung into a position where it may be soldered to a type character supported by one of said matrices, and magnetic means for forming a magnetic circuit through said matrix, said type character and through the entire length of said type bar to hold said type bar in the position wherein it may be soldered to said type character.

37. In apparatus of the kind described, a matrix for supporting a type character with its face downwards, said matrix being adapted to prevent lateral displacement of said type character, means for supporting a type bar in a position wherein one end of it is in a position wherein it may be soldered to a type character supported by said matrix and magnetic means for forming a magnetic circuit through said type character and through the entire length of said type bar to retain said type bar in the position it may be soldered to said type character.

38. In a machine, means for moving a plurality of matrices, successively, to a common point with a corresponding type character in the matrix brought to said common point, means for holding pivotally mounted type bars in positions wherein the free ends thereof are movable, successively, to said common point, means to produce a magnetic field through the length of said type bar and through said type character to hold them in close proximity to each other, and means to apply heat to said bar and said type character to solder them to each other.

JAMES F. KOCA.